(12) United States Patent
Lovell

(10) Patent No.: US 9,124,405 B2
(45) Date of Patent: Sep. 1, 2015

(54) RECEIVER AND METHOD OF RECEIVING

(71) Applicant: Sony Corporation, Minato-ku (JP)

(72) Inventor: Martin Lovell, Reading (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/053,900

(22) Filed: Oct. 15, 2013

(65) Prior Publication Data

US 2014/0169502 A1 Jun. 19, 2014

(30) Foreign Application Priority Data

Dec. 14, 2012 (GB) .................................... 1222555.3

(51) Int. Cl.
*H04L 27/28* (2006.01)
*H04B 1/10* (2006.01)
*H04L 7/00* (2006.01)
*H04L 27/38* (2006.01)
*H04L 5/00* (2006.01)
*H04L 27/26* (2006.01)

(52) U.S. Cl.
CPC ............ *H04L 7/0079* (2013.01); *H04L 5/0007* (2013.01); *H04L 27/2627* (2013.01); *H04L 27/38* (2013.01)

(58) Field of Classification Search
CPC ..... H04J 14/021; H04J 14/0212; H04L 27/38
USPC ................................................... 375/260, 350
See application file for complete search history.

(56) References Cited

U.S. PATENT DOCUMENTS

2002/0114035 A1\* 8/2002 Graves et al. .................. 359/128
2002/0193090 A1 12/2002 Sugar et al.
2006/0073800 A1\* 4/2006 Johnson et al. ............. 455/182.3
2006/0215590 A1 9/2006 Sharma et al.
2008/0225175 A1\* 9/2008 Shyshkin et al. ............. 348/572
2010/0167685 A1\* 7/2010 Burke et al. .................. 455/341
2012/0076183 A1\* 3/2012 Dapper et al. ................ 375/219

(Continued)

FOREIGN PATENT DOCUMENTS

KR 10-2011-0134968 12/2011
WO WO 2011/097646 A1 8/2011
WO WO 2013/070458 A2 5/2013

OTHER PUBLICATIONS

United Kingdom Search Report issued on Jun. 17, 2013 in GB 1222555.3, filed on Dec. 14, 2012 ( with written opinion).

(Continued)

*Primary Examiner* — Don N Vo
(74) *Attorney, Agent, or Firm* — Oblon, McClelland, Maier & Neustadt, L.L.P.

(57) ABSTRACT

A receiver receives payload data from a downstream signal, and includes a filter to receive the downstream signal, and including signalling data identifying downstream resources for the payload data, and an analog to digital converter to receive the downstream signal from the filter and to convert it into a sampled digital form. A demodulator demodulates the digital form of the downstream signal to recover the payload data and the signalling data. The signalling data includes a mode switch signal to indicate an active mode or a sleep mode for the receiver. A controller detects the mode switch signal to control the analog to digital converter to switch sampling rates in response thereto, and to control the filter to switch frequency bands. The frequency bands perform anti-alias filtering for respective sampling rates.

19 Claims, 10 Drawing Sheets

(56) References Cited

U.S. PATENT DOCUMENTS

2012/0236802 A1 9/2012 Gong
2013/0335632 A1* 12/2013 Silver et al. .................. 348/571

OTHER PUBLICATIONS

12-Bit, 3.2/2.0 GSPS RF Sampling ADC, ADC 12D1600/1000RF, Texas Instruments, Jun. 5, 2012, 67 pages.

Chun-Ying Chen et al. "A 12-Bit 3 GS/s Pipeline ADC with 0.4 mm$^2$ and 500 mW in 40 nm Digital CMOS", IEEE Journal of Solid-State Circuits, vol. 47, No. 4, Apr. 2012, 9 pages.

Data Over Cable Service Interface Specifications DOCSIS® 3.0, Physical Layer Specification, CM-SP-PHYv3.0-I10-111117 171 pages.

Data-Over-Cable Service Interface Specifications DOCSIS 3.0, MAC and Upper Layer Protocols Interface Specification, CM-SP-MULPIv3.0-I20-121113, 760 pages.

* cited by examiner

RECEIVER AND METHOD OF RECEIVING

CROSS REFERENCE TO RELATED APPLICATIONS

The present application claims priority to United Kingdom Application 1222555.3 filed on 14 Dec. 2012 the contents of which being incorporated herein by reference in its entirety.

FIELD OF THE DISCLOSURE

The present disclosure relates to receivers for receiving payload data from a downstream signal. In some embodiments the downstream signal is received from a cable network.

BACKGROUND OF THE DISCLOSURE

There are various media via which data can be communicated including terrestrial and satellite radio frequency signals for both broadcast systems and cellular mobile communication systems where mobile terminals communicate using radio signals to a network of base stations. Another media for communicating data is a cable network which can be a coaxial cable or optical fibre in which data is modulated and communicated through the cable. Cable systems can be used to form broadcast systems in which a Cable Modem Termination System (CMTS) or head end modulates data onto signals for transmission through the cable network to a receiver which is known as a Cable Modem (CM). An example of a cable modem system which has been developed for communicating data including television signals via a cable network is the Data Over Cable Service Interface Specifications (DOCSIS) system which is administered by CableLabs. DOCSIS 3.0 for example provides a physical layer and a media access layer specification for arranging for data to be communicated via a cable network. The specification provides various communication techniques between the CMTS and the CMs for efficiently using an available bandwidth within the cable network.

One improvement which can be made to CMs is to reduce power consumption particularly for example when there is no payload data being transmitted to the CM by the CMTS.

SUMMARY OF DISCLOSURE

Embodiments of the present disclosure can provide a receiver which is configured to switch between an active mode in which the receiver is detecting and recovering data from the full bandwidth of a downstream signal and a sleep mode in which the receiver is only recovering data from a low frequency part of the full bandwidth of the downstream signal. The receiver is therefore able in response to an indication in physical layer signalling provided within the downstream signal to recover a mode switch signal which is used by the receiver to switch between the active mode and the sleep mode. The mode switch signal is transmitted in a low frequency component of the downstream signal and may provide either a sleep mode signal or a wake-up signal or both. In the sleep mode the receiver is configured to save power. To this end the receiver includes an analogue receiving filter which is configured to receive the downstream signal representing the payload data and physical layer signalling data which identifies the downstream communications resources which represent the payload data. The receiver includes an analogue to digital converter which is configured to receive the downstream signal from the analogue receiving filter and to convert the downstream signal into a sampled digital form in accordance with a sampling rate which is matched to the bandwidth of the analogue receiving filter. A demodulator is configured to demodulate the digital form of the downstream signal to recover the payload data and the physical layered data. A controller detects the mode switch signal provided within the physical layer signalling data and in response switches to one of the active mode or the sleep mode from the other of the active mode or the sleep mode. The controller responds to the mode switch signal to control the analogue to digital converter to switch from a first sampling rate to a second sampling rate and to control the analogue receiving filter to switch from the first frequency band to a second frequency band. The first frequency band serves to perform anti-alias filtering in respect of the first sampling rate and the second frequency band serves to perform anti-alias filtering in respect of the second sampling rate.

Various further aspects and features of the disclosure are defined in the appended claims and include receivers and receiving methods.

BRIEF DESCRIPTION OF THE DRAWINGS

Embodiments of the present disclosure will now be described by way of example only with reference to the accompanying drawings in which like parts contain the same numerical references and in which.

DESCRIPTION OF EXAMPLE EMBODIMENTS

Embodiments will be explained with reference to a transmission network, which transmits payload data to receivers which may communicate for example internet protocol packets to the receivers. The receivers may include or form part of a cable modem. In some examples the transmitter and receivers form part of a cable network operating, for example, in accordance with a DOCSIS standard.

Embodiments of the present disclosure utilise a so called full band capture analogue to digital converter which is arranged to convert a radio frequency signal across its entire bandwidth from the analogue domain to the digital domain. Payload and physical data are then recovered in the digital domain by performing down converting and filtering to isolate a frequency band in which respective components of the downstream signal are carried. Full band capture analogue to digital conversion provides an advantage in respect of switching to different parts of the receiver downstream signal to isolate different channels, which would otherwise require a different analogue radio frequency tuner for each channel. Full band capture analogue to digital conversion has been proposed in receivers for forming cable modems. Accordingly by switching the receiver from a first clock frequency which represents a sampling rate for capturing the full bandwidth of the received radio frequency signal to a second clock frequency which represents a second sampling rate of a second band which is a lower frequency band within the first (full) frequency band in which the mode switch signal is carried by the downstream signal, a receiver can enter a sleep mode in which power savings can be made. Power saving is possible by reducing the clock frequency of the receiver. In some embodiments the power saving is achieved by switching between two radio frequency low pass filters configured for high and low bandwidth respectively. Furthermore, other analogue components can be switched to a low power mode such as a low noise amplifier by switching a dynamic range of analogue circuits to a lower level through techniques including reduction of bias currents of active analogue circuit components. Therefore a power saving can be achieved in the power save or sleep mode when these circuits are required to recover only the physical layer signalling in which the mode switch signal in carried. Accordingly, receivers embodying the present technique can be arranged to save substantial power.

Figure 1:
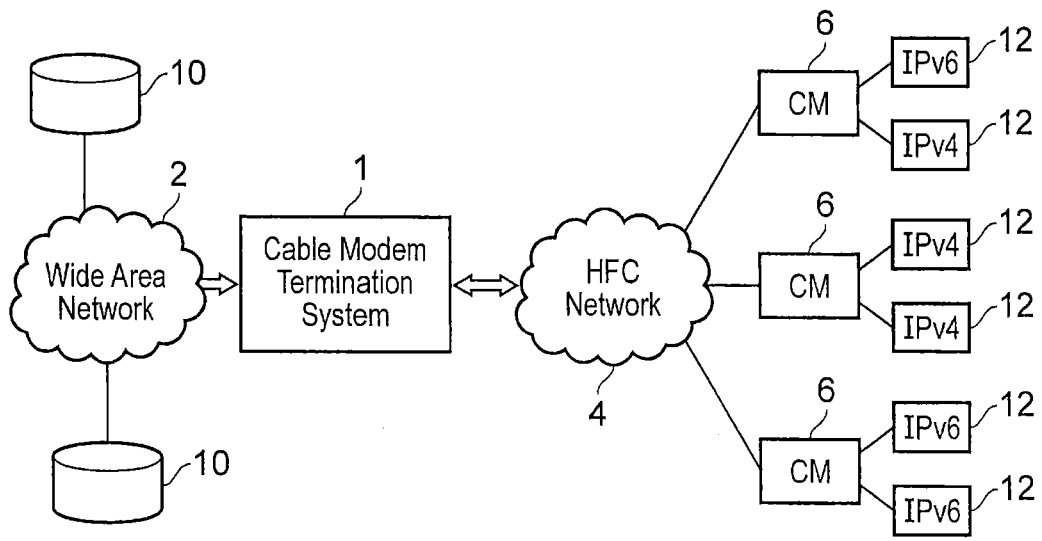
FIG. 1 is a schematic block diagram of a cable network illustrating one example of the present technique.

An example of a cable modem system is shown in FIG. 1. In FIG. 1, a cable modem termination system (CMTS) or head end 1 is connected to a wide area network 2. The wide area network can provide a communications medium through which data can be accessed from sources for transmission by the CMTS via a hybrid fibre-coax network 4 to cable modems (CM) 6. One or more servers 10 may be connected to the wide area network 2 for communicating data to the CMTS 1 for transmission via the hybrid fibre-coax network 4 to the CMs 6. The CMs 6 are connected to devices 12 for receiving the data transmissions which may operate in a transport layer using an internet protocol such as IPV4 or IPV6. The devices 12 may be user devices such as televisions, set top boxes, personal computers or any other devices for receiving user data via a CM.

FIG. 1 illustrates an example cable network in which the hybrid fibre-coax network 4 is formed from a combination of coaxial cable and optical fibre and therefore can be referred to as a hybrid fibre coax (HFC) network. The hybrid fibre-coax network 4 is therefore used to provide a transmission medium for transmitting data to and from the CMs 6 from and to the CMTS 1 which forms a head-end of the cable network system. A simplified illustration of components for communicating data in accordance with the present technique is illustrated in FIG. 2.

Figure 2:
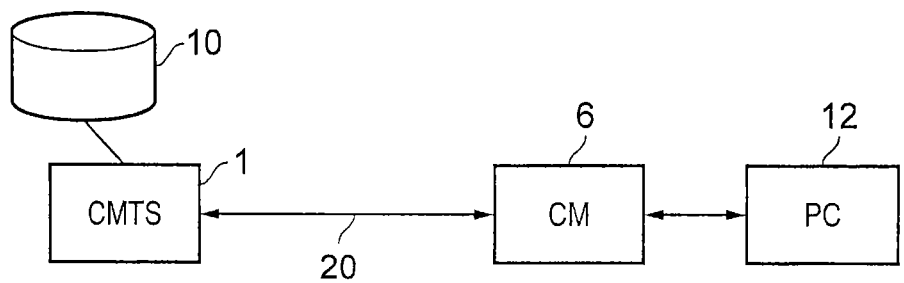
FIG. 2 is a more simplified view of a communication between a cable modem termination system (CMTS) and the cable modem (CM) within the network shown in FIG. 1.

In FIG. 2 the CMTS 1 is shown to be connected to the CM 6 via a link 20 which is formed by the HFC network. A personal computer (PC) 12 is connected to the cable modem 6 although it will be appreciated that various user devices could be connected to the CM 6 for transmitting and receiving data. Similarly, the server 10 is connected to the CMTS 1 for delivering services including broadcast data such as video streaming for transmission over the cable network to the PC 12.

The present technique can find application in communications systems such as cable networks in which data is transmitted and received, for example, in accordance with a DOCSIS standard. DOCSIS standards are administered by CableLabs, which releases agreed specifications for each version of the standard. For example DOCSIS 3.0 provides a physical layer specification in document CM-SP-PHYV3.0410-11117 and a media access layer specification in a document CM-SP-MULPIV3.0420-121113. The DOCSIS specifications therefore provide a media access layer and a physical layer in addition to other related specifications for communicating data over a cable network such as those illustrated in FIGS. 1 and 2.

Figure 3:
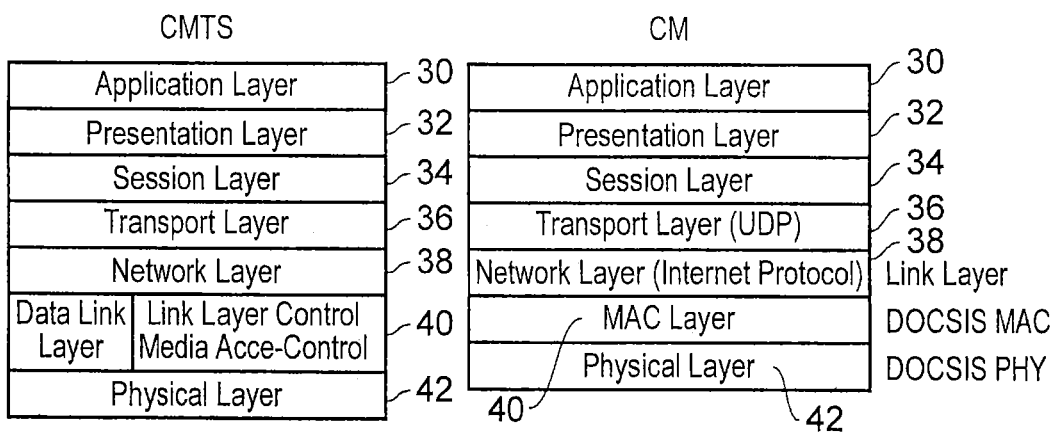
FIG. 3 provides an illustrative representation of a protocol stack of the CMTS and CM operating in one example in the systems shown in FIGS. 1 and 2.

In the following description of example embodiments the term scheduling interval will be used to refer to a period in which a transmission of data for each of the data profiles is available in a round-robin arrangement, but for which data may not be transmitted for all data profiles. A protocol stack illustrating various layers in an OSI model for the CMTS and the CM is shown in FIG. 3. As shown in FIG. 3, the protocol stack includes an application layer 30 a presentation layer 32, a session layer 34 a transport layer 36 and a network layer 38. The network layer 38 could be formed by an internet protocol and provides a link layer in the cable network between the CMTS and the CM. A media access control layer 40 which, for example, may be specified as a DOCSIS MAC layer communicates data from the network layer to the physical layer 42 which may be specified in accordance with a DOCSIS physical layer 42. The arrangement of the protocol stack is provided in order to transmit and receive data via the cable network 4 so that application layer programmes operating on a PC for example can receive data from the server 10. Of particular relevance to the technique provided in the present disclosure is the MAC layer 40 and the physical layer 42. An example of a physical layer 42 will now be explained.

Figure 4:
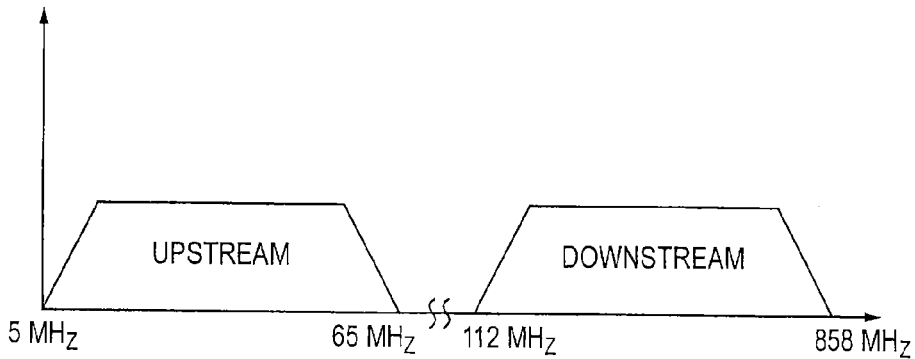
FIG. 4 is a graphical representation illustrating frequency bands for upstream and downstream communication of a cable network system.

FIG. 4 provides an illustrative representation showing the upstream and downstream frequency bands of an example system. As shown in FIG. 4 the upstream frequency band is shown between 5 and 65 MHz whereas the downstream frequency band is much larger between 112 and 858 MHz. The arrangement shown in FIG. 4 corresponds substantially to the Euro DOCSIS 3.0 standard although it will be appreciated that these frequency ranges are just examples and other upstream and downstream frequencies and the location of the bands can be different in other example embodiments. In some embodiments notches may exist in the frequency channel which are not used to carry data.

Figure 5:
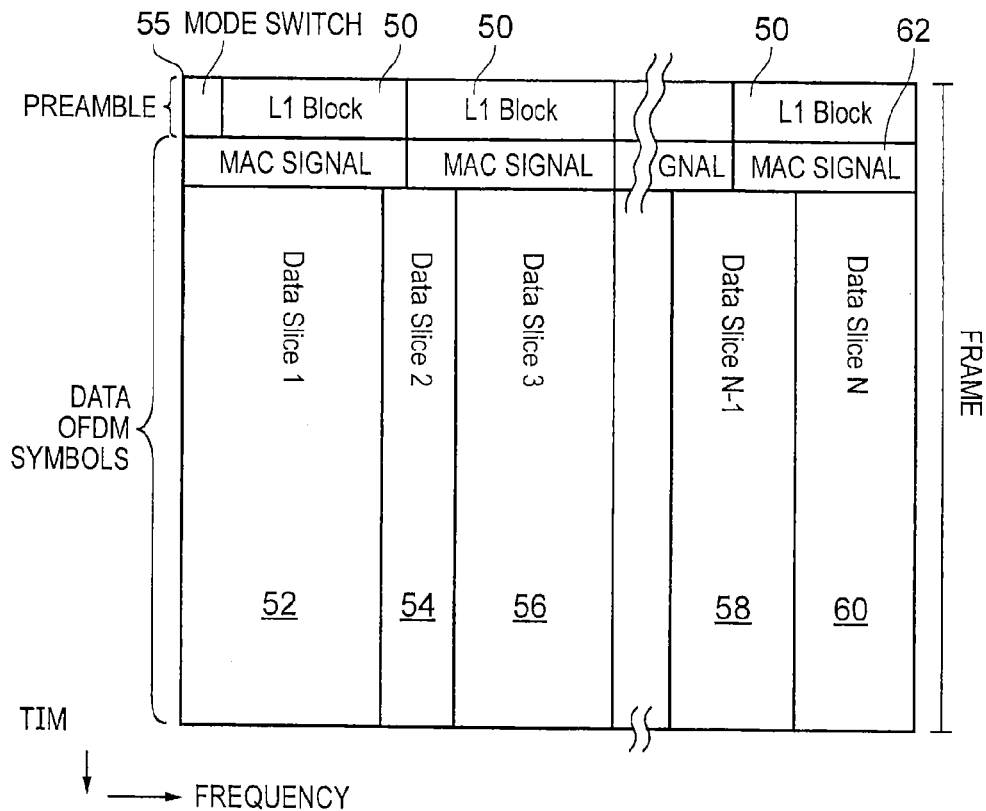
FIG. 5 is an illustrative representation showing a make-up of downstream communication scheduling interval using orthogonal frequency division modulation (OFDM)

In an example implementation of a physical layer for a cable network system Orthogonal Frequency Division Multiplexing (OFDM) can be used to provide bandwidth efficient communication of data on both the upstream and the downstream of a cable network system. An example of a downstream structure for communicating data is shown in FIG. 5 which corresponds substantially to an arrangement disclosed in the DVB-C2 standard but adapted to include features for a DOCSIS implementation. As shown in FIG. 5, a frame structure is presented in a graphical form with frequency on the x-axis and time on the y-axis time, with time going down from the top to the bottom of the page. In FIG. 5, a first part of the frame provides, in a preamble to the scheduling interval, layer one (L1) data in L1 blocks 50. Each of the L1 blocks includes the same information describing the position and location of the data bearing slices 52, 54, 56, 58 and 60. According to the arrangements shown in FIG. 5 and consistent with the DVB-C2 standard, the data slices conveying data for each of a different number of channels have a different bandwidth which varies within a predetermined maximum bandwidth which is a useful bandwidth of the receiver. Thus, within the available bandwidth of the channel, a width of each of the data slices may vary so that some services may be provided with more bandwidth than others. Thus, the layer one (L1) signalling blocks 50 provide layer one data describing the position and location of each of the data slices. As can be seen in the preamble forming part of one of the L1 blocks is a mode switch or sleep mode signal 55. As can be seen in FIG. 5 the switch mode signal 55 forms part of the preamble of the scheduling intervals and furthermore forms part of the lowest frequency components of subcarriers of OFDM symbols which form the preamble. As such, to receive the switch mode signal a receiver only needs to tune into this section of the downstream signal.

In some embodiments, a block of subcarriers or portion within a channel of a predetermined bandwidth is used as a signalling channel.

Also shown in FIG. 5, a second upstream signalling burst or block 62 appears just after the L1 block 50. The upstream signalling block 62 provides a portion of the scheduling interval which delivers messages associated with MAC layer messages for requesting and allocating resources on the upstream.

Figure 6:
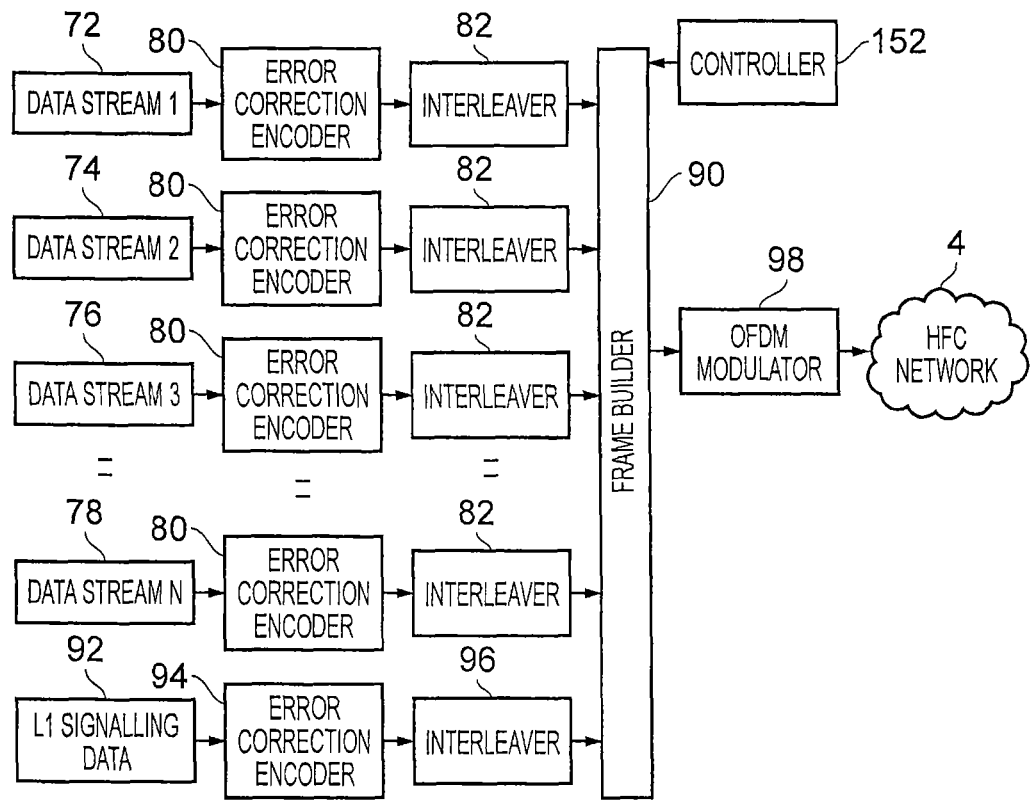
FIG. 6 is a schematic block diagram illustrating an example transmitter.

A transmitter for generating the transmission frame shown in FIG. 5 is presented in FIG. 6. As shown in FIG. 6 each of the data streams which is delivering data for transmission corresponds to one of the data slices shown in FIG. 5. Thus as shown in FIG. 6 each of the data streams 72, 74, 76, 78 is generating data for transmission via the cable network system and corresponds to one of the data slices shown in FIG. 5. For each of the data streams an error correction encoder 80 is provided for encoding the data to be transmitted in accordance with an appropriate error correction code. An interleaver 82 then performs interleaving of the data in the time or the frequency domain before feeding the encoded data to a frame builder 90. A lower branch of the transmitter provides signalling data, which could include, for example, the layer one signalling data from a block 92 which is error correction encoded with an error correction encoder 94 before being time interleaved by an interleaver 96 and fed to the frame builder 90. The frame builder 90 forms the scheduling interval of data such as those that are shown in FIG. 5. The scheduling interval of data is then converted into the frequency domain by an inverse fast Fourier transform (FFT), a cyclic prefix is added, and the signal is then converted to an analogue format using a digital to analogue converter and finally frequency converted to the required transmission frequency by an RF modulator. For simplicity these operations are represented by the operation of an OFDM modulator 98 and transmitted via the cable network as explained with reference to FIGS. 1 and 2. Therefore, as shown in FIG. 6 the OFDM modulator 98 modulates the data slices as well as the signalling data on to OFDM symbols which are modulated in the frequency domain and transformed into the time domain.

Figure 7:
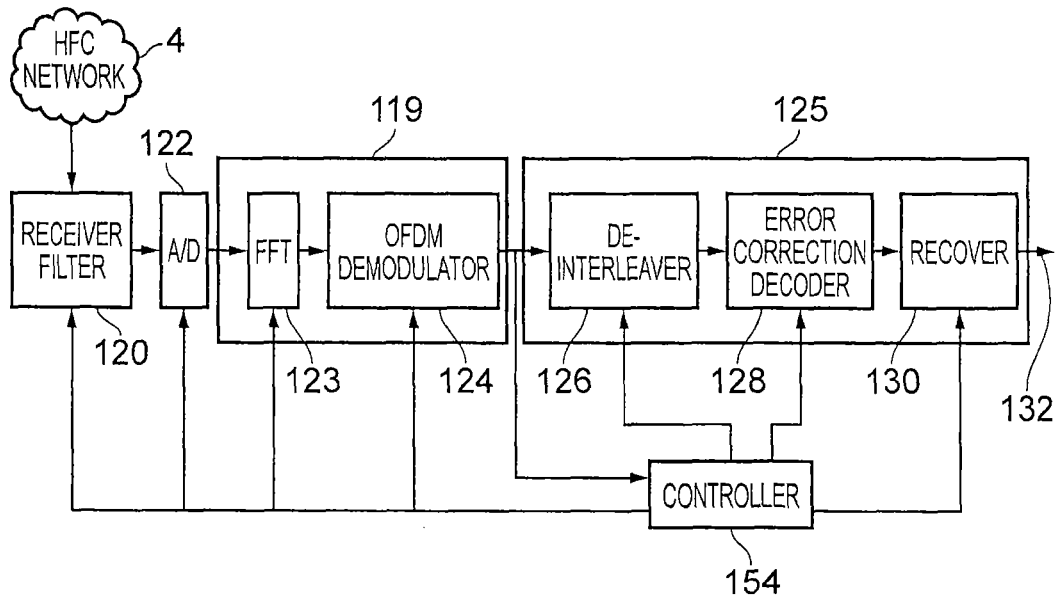
FIG. 7 is a schematic block diagram showing a receiver operating in accordance with the present technique.

At a receiver in a CM 6 the transmitted data for one or more of the data slices is detected and recovered. An example block diagram of a receiver is shown in FIG. 7. In FIG. 7 the receiver comprises a receiver filter 120, an analogue to digital converter 122, a demodulator 119 and a decoder block 125. The receiver filter 120 receives the radio frequency downstream signal from the HFC network 4 and performs filtering and/or low noise amplifying of the downstream signal in the analogue domain before this is fed to the analogue to digital converter 122. The analogue to digital converter 122 converts the downstream signal into the digital domain which is then fed to a demodulator 119. The demodulator 119 includes a fast Fourier transform processor 123 and the OFDM modulator 124. In combination the fast Fourier transform processor 123 converts the digital time domain signal into the frequency domain in order for the OFDM demodulator 124 to recover the payload and the physical layer signalling data from the downstream signal.

Generally the decoder block 125 performs base band decoding and processing to recover the payload data. As shown in FIG. 7, the example decoder block includes a de-interleaver 126, an error correction decoder 128 and an interface circuit 130 to output the payload data on a channel 132. Data from one or more of the data slices can be detected and recovered in accordance with the layer one (L1) signalling information, which is also received before the data slices from the signalling blocks from the downstream signal. The data is then de-interleaved by the de-interleaver 126 and decoded using the error correction decoder 128 before being fed to the interface circuit 130 for communicating to a personal computer for example as shown in FIG. 2.

As shown in FIG. 7 a controller 154 is provided to control the FFT processor 123, OFDM demodulator 124, the de-interleaver 128 and the error correction decoder 128 to detect the layer one data and then use the layer one data to detect and recover the payload data from one or more of the data slices. Thus the receiver is arranged to first recover the layer one data from the layer one data blocks 50 in order to tune the receiver filter 120 to the data slice in which the payload data for a particular channel is to be recovered. The controller 154 may also use the layer one physical layer data recovered from the downstream signalling by the decoding block 125 to configure the demodulator 119 and the decoder 125 to recover the payload data from a part or parts of the downstream signal as will be explained.

Figure 8:
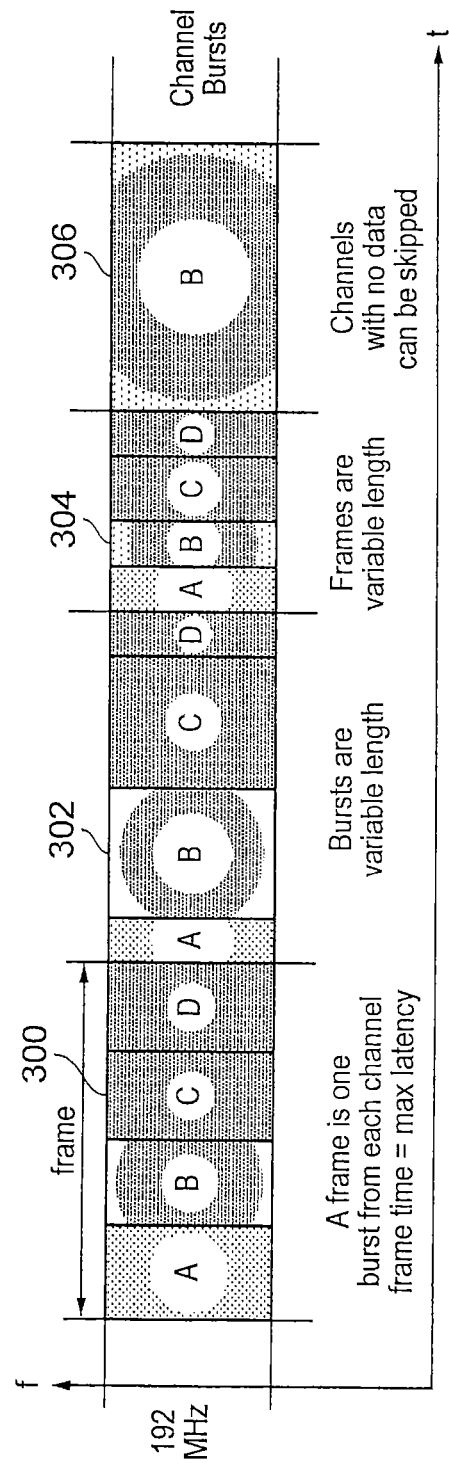
FIG. 8 is a schematic illustration of a downstream signal generated by a transmitter from the CMTS to the CM according to one example using time-slicing.

FIG. 8 provides a further illustration of a frame structure corresponding to that shown in FIG. 5. FIG. 8 includes a further enhancement in which transmission scheduling intervals are divided into sections each of which corresponds to a burst transmission to be applied to one of a different set of receiver CMs. The sets of CMs are divided in accordance with the ability of the CM receiver to detect and recover the data from the downstream and/or an environment in which the CM is operating to detect and recover the downstream data. As will be appreciated it is desirable to use the most spectrally efficient modulation schemes in order to increase an efficiency with which data is communicated via a cable network. For example, it is desirable to use modulation schemes with a very high constellation number such as 4096 QAM. Having regard to a relatively benign environment for communicating signals via a cable network providing very high signal to noise ratios, it is possible to use such spectrally efficient modulation schemes. However, the reception environment varies depending on, for example, how close a receiver is to the CMTS or head end. If the receiver is very close then the very high signal to noise ratios can be obtained and therefore highly spectrally efficient modulation schemes can be used. If however the receiver is some distance from the CMTS then a reception environment may be harsh in which case it will not be possible to use very highly spectrally efficient modulation schemes because the signal to noise ratio may not be high enough. Accordingly, for such receivers it will appropriate to use a different modulation scheme, possibly reducing the rate of error correction encoding by increasing an amount of redundancy of the code. As such, it has been proposed to divide the receivers into different categories and use different transmission parameters, for example, modulation schemes, encoding rates and transmission power etc. in accordance with a profile of the receivers. Accordingly, the scheduling interval shown in FIG. 8 is divided into four possible profiles A, B, C, D.

As may be understood from the example embodiments, data profile is a term which may be used to convey a list of modulations for each sub-carrier in an OFDM channel, and a slice is a fraction of the downstream OFDM channel which has a specific membership group of CMs.

In a first scheduling interval 300 the profiles are divided equally in time between the four possible categories A, B, C, D. In a second scheduling interval 302 category A receives a relatively small allocation as well as category D and the remainder is divided into categories B and C. A different arrangement is shown in the third scheduling interval 304 and the final scheduling interval provides an allocation to only to file B. Accordingly, an allocation of communications resources within a scheduling interval or between scheduling intervals is provided in correspondence with an ability of the receivers to receive data being communicated. The data transmitted in each profile A, B, C, D may be the same payload data in, for example, a transmission environment which is broadcasting data to all CM's such as television broadcast data or each profile may be transmitting different data.

In a further example, rather than communicating data for each of the different data profiles in accordance with a time slicing of downstream communicates resources, data may be transmitted on the downstream to each of the data profiles by slicing the communications resources in frequency.

Figure 9:
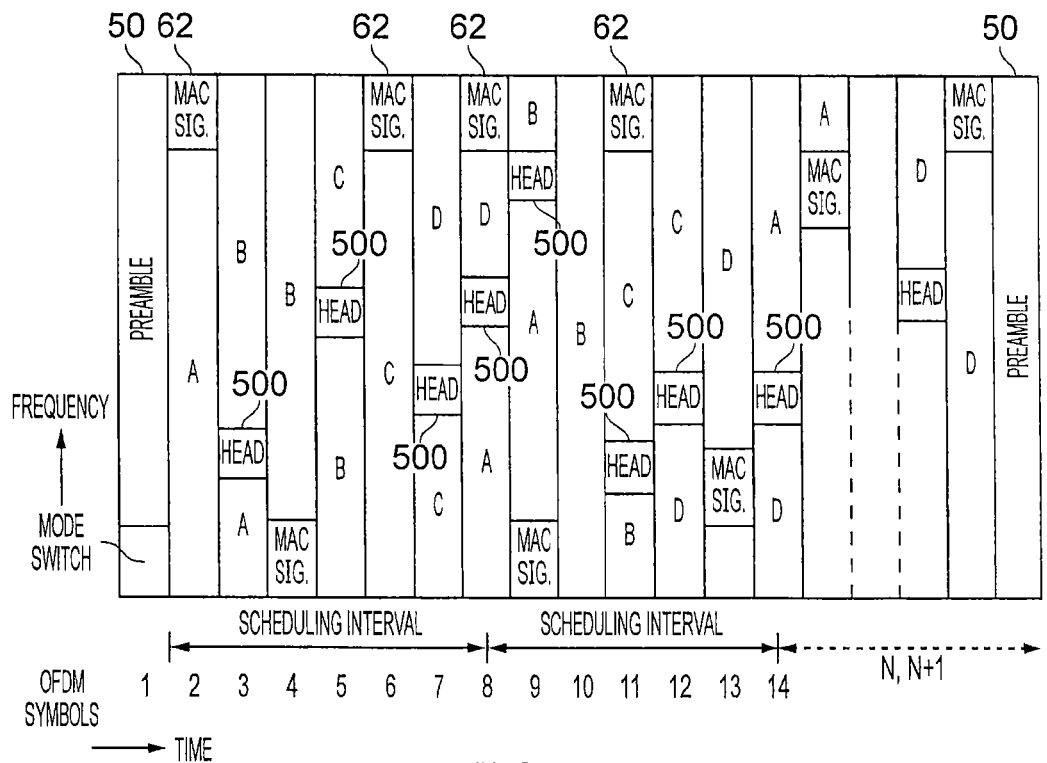
FIG. 9 is a schematic illustration of a downstream signal formed using frequency-slicing between a plurality of data profiles A, B, C, D.

Whilst FIGS. 5 and 8 illustrate time slicing, in another embodiment frequency slicing is used to divide up downstream communications resources between each of the different data profiles. In FIG. 9 a plurality of OFDM symbols 400 are shown with frequency on a vertical axis and time on the horizontal axis. As shown in FIG. 9, each of the OFDM symbols 400 includes a plurality of OFDM cells which represent subcarriers carrying data on the OFDM symbol as well as pilot symbols. Each of the data slices A, B, C and D are allocated subcarriers on successive OFDM symbols such that the resources are sliced and allocated to each data profile by frequency. Thus, for example, slice A starts from OFDM symbol 2 and continues to OFDM symbol 3 and is separated by a header 500 after which the following OFDM symbols are allocated to slice B which continues to OFDM symbol 4. Also shown in FIG. 9 is the preamble OFDM symbol 50 which occurs relatively infrequently and not associated with the scheduling interval. Each of the data profiles is separated in the frequency domain by a header 500 which may in one example be a forward error correction (FEC) header.

Also shown in FIG. 9 is the mode switch signal forming part of the preamble 50 which is formed in a lower frequency component of the frequency band of the OFDM symbols which form the preamble, which is also shown in FIG. 5.

The arrangement shown in FIG. 9 illustrates an example in which the data in the form of packets is divided into forward error correction (FEC) packets by dividing the data into data blocks and encoding the data into separate FEC packets. An example of the FEC packets is shown in FIG. 10.

Figure 10:
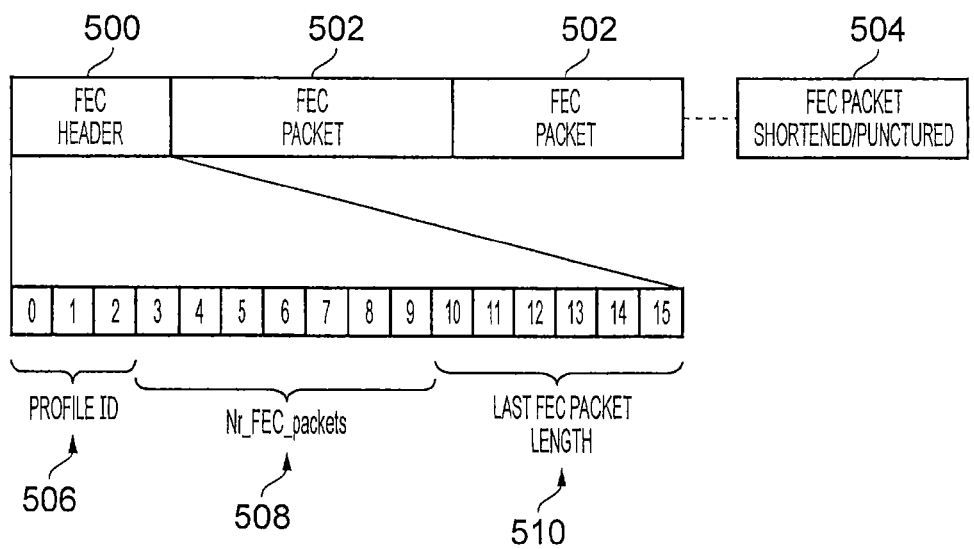
FIG. 10 is a schematic illustration of a payload data for a profile encoded as a plurality of forward error correction (FEC) packets and including a FEC header.

In FIG. 10 an FEC header 500 heads a plurality of FEC packets 502 which are terminated with a final FEC packet 504 which may be shortened or punctured in order to fit into an available allocation of communications resources on the downstream. The FEC header 500 includes data, for example, 16 bits which is divided into a profile ID 506, a number of FEC packets in the data profile slice 508 and a last FEC packet length 510. Thus with each of the data profiles A, B, C, D the FEC header 500 and FEC packets 502 are mapped onto the subcarriers of the OFDM symbols in the frequency domain as shown in FIG. 10. Furthermore each of the data profiles also includes in the frequency domain a MAC signalling burst or block 62, rather than occupying a separate time portion, the MAC signalling block 62 forms part of the frequency slice allocated to each of the different data profiles A, B, C, D.

Figure 11:
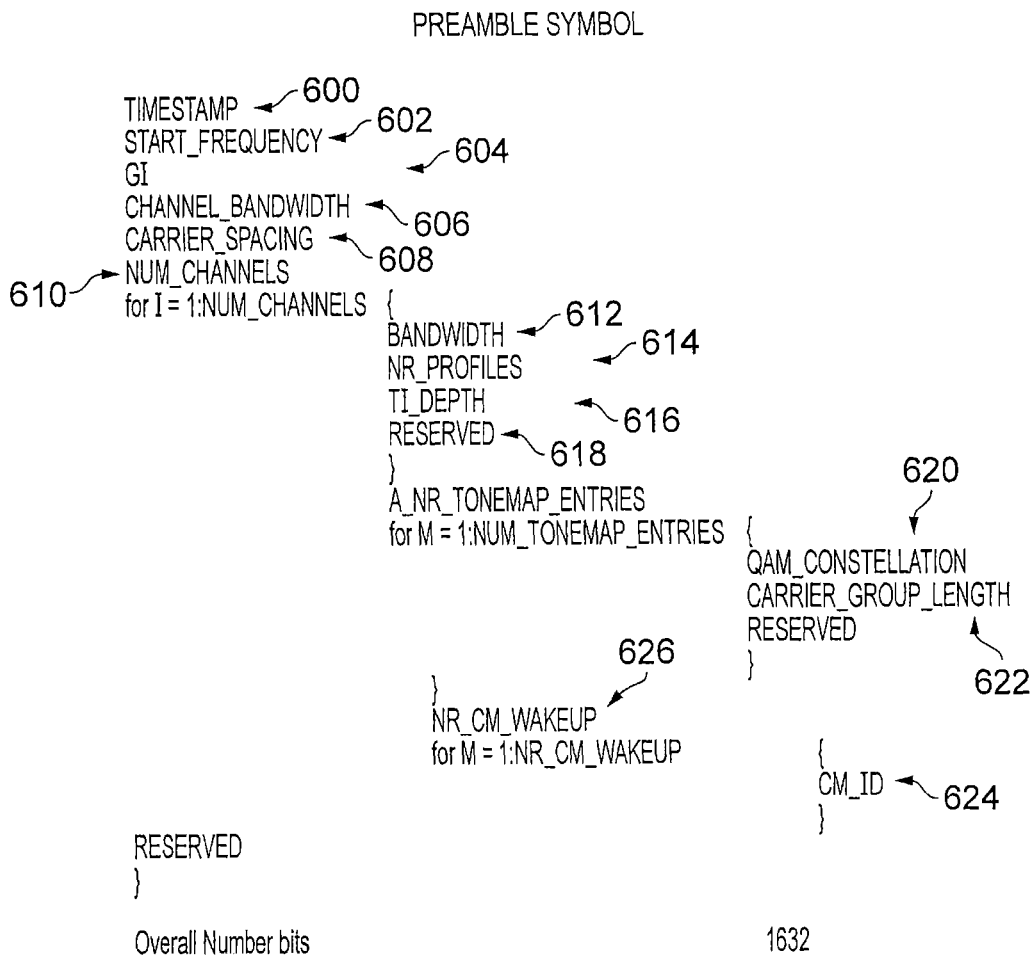
FIG. 11 is a representation of an example of physical layer signalling for forming a preamble symbol.

FIG. 11 provides an illustration of parameters which may be included in the preamble symbol carrying the layer 1 block 50. The preamble symbol may include a time stamp 600, indicating a time at which the preamble symbol is transmitted, a start frequency 602, a guard interval duration 604, a channel bandwidth 606, a spacing between subcarriers 608 and a number of channels 610. For each of the number of frequency channels, an indication is given of the bandwidth 612, a number of profiles within the channel 614, a time interval depth 616 and a reserved field 618. For each of the channels a number of tones is indicated providing a modulation constellation 620, a carrier group length 622, a cable modem identifier 624 as well as a wake up flag for each of a number of CMs which should be activated in a field 626.

Power Saving Receiver

As indicated above embodiments of the present technique utilise full band capture analogue to digital converters, which perform a transformation of a received analogue signal into the digital domain across the full bandwidth of the downstream signal. Full bandwidth capture analogue to digital converters are disclosed for example in an article published by the IEEE Journal of Solid-State Circuits, Volume 47, number 4, April 2012 entitled "A 12-Bit 3 Giga samples per second Pipeline ADC With 0.4 mm and 500 mW in 40 nm Digital CMOS" by Chun-Ying Chen. Whilst traditional analogue tuners have been provided to perform down conversion of a received signal to base band form before performing analogue to digital conversion, analogue tuners do not scale easily when there is more than one channel from which data is to be recovered. For the present example it will be appreciated that data from a particular profile (A, B, C, D) must be recovered from the entire bandwidth of the downstream signal. To support simultaneous access to more than one channel a system must include an analogue tuner for each channel and a demodulator for each channel. Since analogue tuners consume a significant amount of power in the RF front end of a receiver the overall power increases and a spatial foot print of the tuners in respect of the size of circuitry on a silicon chip or a circuit board can be considerable and increases costs. Whilst wideband tuners are available to reduce a number of analogue tuners required by a receiver, the use of wideband tuners implies constraints and limitations on the frequency allocation for DOCSIS services. Using a full band capture analogue to digital converter allows down conversion and isolation of different channels to be performed in the digital domain which can therefore reduce cost, save power and save a size of implementation of a receiver.

Figure 12A:
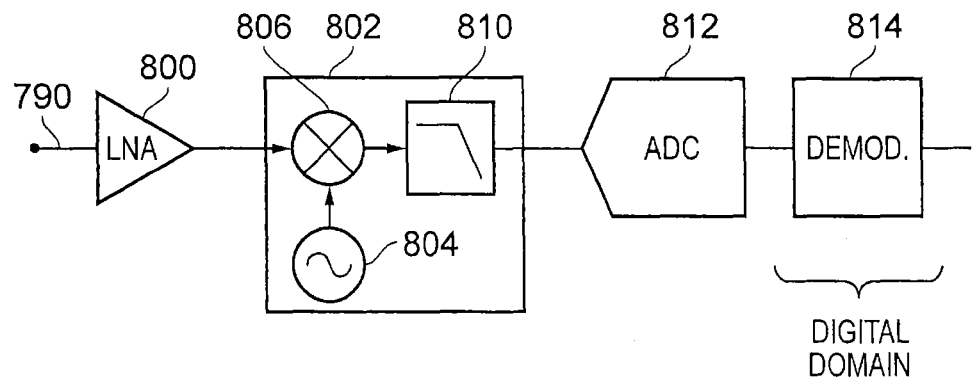
FIG. 12a is a schematic block diagram illustrating a receiver with a conventional analogue tuner.
Figure 12B:
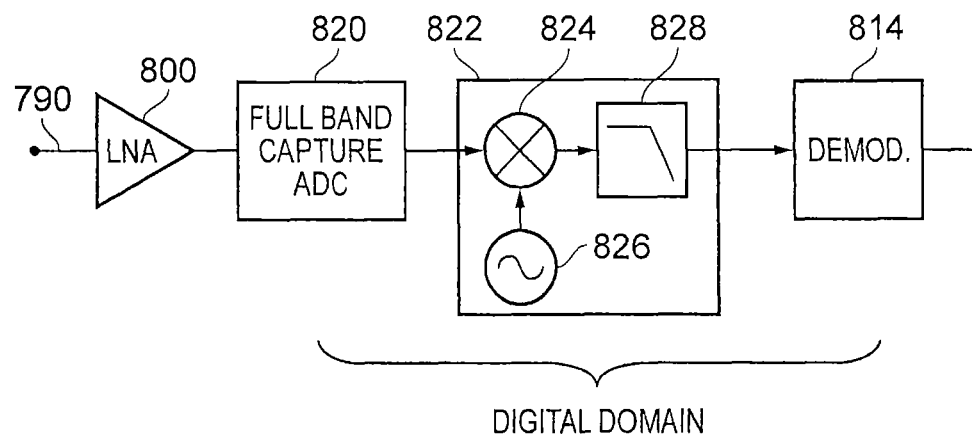
FIG. 12b is a schematic block diagram illustrating a receiver with full band capture analogue to digital conversion.

FIGS. 12a and 12b provides a general illustration of full band capture analogue to digital conversion. In FIG. 12a a low noise amplifier 800 receives a downstream signal which is fed to a radio frequency tuner 802. The radio frequency tuner includes a local oscillator 804 and a mixer 806 which cooperate to multiply the downstream signal received from the low noise amplifier 800 to down convert the downstream signal to an intermediate or base band frequency which is isolated within a lower frequency band by a low pass filter 810. An analogue to digital converter 812 then converts the base band analogue signal to the digital domain which is then demodulated by a demodulator 814.

In contrast FIG. 12b illustrates an architecture in which full band capture analogue to digital conversion is used. The downstream signal is received by the low noise amplifier 800 as it is in FIG. 12b. However, the radio frequency analogue signal is then fed to a full bandwidth capture analogue to digital converter 820 which converts the entire bandwidth of the downstream signal received from the low noise amplifier 800 into the digital domain. The down conversion of the downstream signal is then performed by a digital down conversion unit 822 which includes a mixer 824, a local oscillator 826 and a low pass filter 828 which operate substantially as the arrangement shown in FIG. 12a but in the digital domain. Accordingly, in the digital domain the down conversion of the digital downstream signal is performed in a more flexible and power efficient way as explained above. The demodulator 814 then performs demodulation of the digital base band signal as is performed for FIG. 12a.

As explained above it has been proposed in our co-pending patent applications EP12186992.9 and EP121186993.7 to include a sleep indication signal (mode switch signal) within a preamble of the downstream signal, which can form part of the physical layer signalling. The sleep indication signal can be used to switch a receiver from an active state or mode to a sleep mode in which circuits are switched to a low power mode. Receivers adapted in accordance with the present technique utilise the sleep indication signal in order to switch to a low power mode. Example embodiments will now be described.

Figure 13:
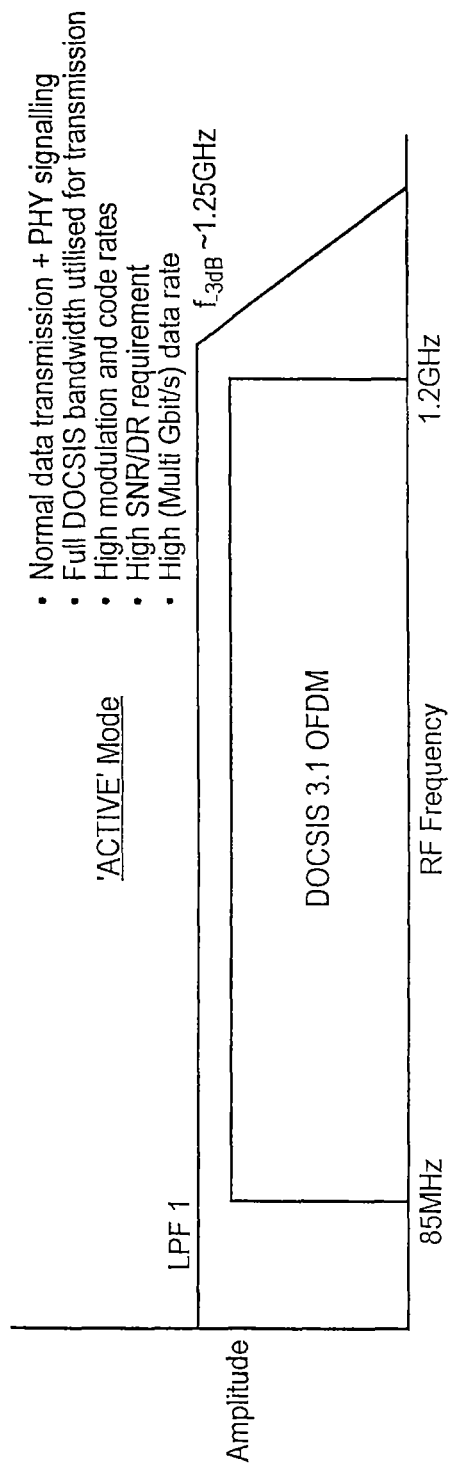
FIG. 13 is a graphical plot of amplitude with respect to frequency illustrating a pass band of a low pass filter forming a first analogue receiving filter, in which the pass bandwidth includes the whole of a downstream signal received from a CM network.

FIG. 13 shows a simplified representation of the downstream signal which has been described above with reference to FIGS. 5, 8 and 9 in which the downstream signal is shown within a frequency band extending from 85 MHz to 1.2 GHz. Accordingly, in an active mode a receiver must recover the payload data from the entire bandwidth of the downstream signal represented in FIG. 13 as explained above.

Figure 14:
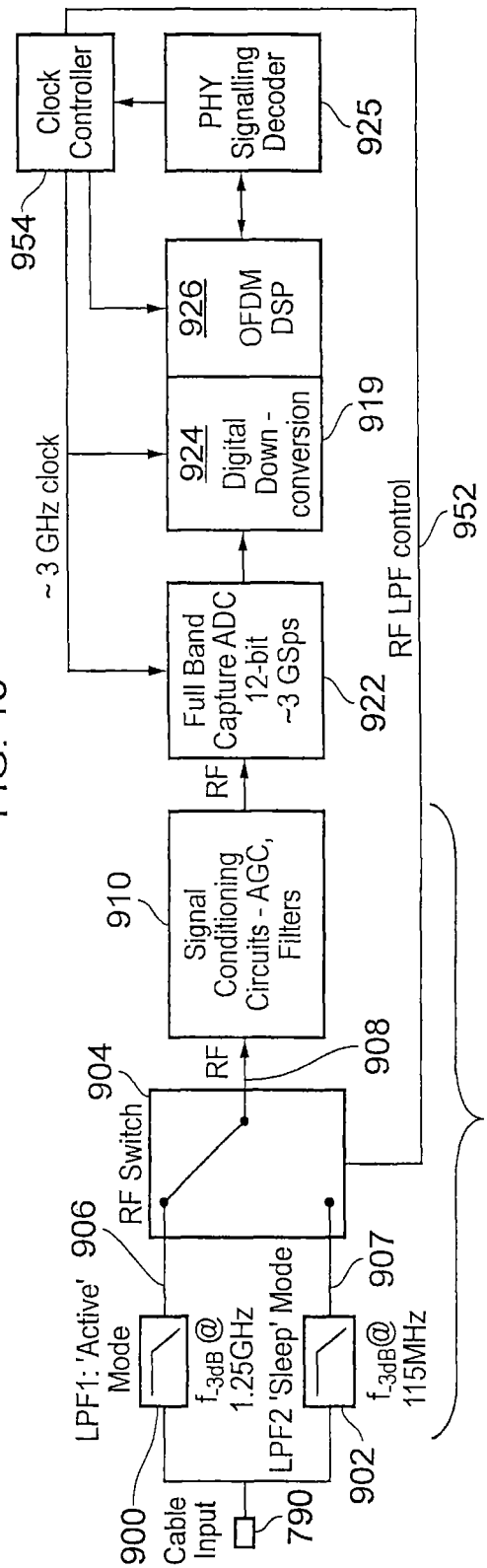
FIG. 14 is a schematic block diagram of an example receiver for forming a CM which is operating in an active mode.

A receiver for recovering data from the downstream signal illustrated in FIGS. 13, 5, 8 and 9 is shown in FIG. 14 in an active mode. As shown in FIG. 14 the downstream signal is received from the HFC network 4 from a cable input 790 and is fed to a first analogue receiving filter 900 and a second analogue receiving filter 902. Outputs 906, 907 respectively from the first analogue receiving filter 900 and the second analogue receiving filter 902 are fed to inputs of an RF switch 904. As shown in FIG. 14, the RF switch 904 is currently set to switch signals from the output channel 906 of the first analogue receiving filter 900 to an input 908 of a signal conditioning circuit 910. The signal conditioning 910 performs various functions such as automatic gain control filtering etc. on the analogue domain downstream signal. The output from the signal conditioning circuit 910 is fed to an input of a full band capture analogue to digital converter 922. The full band capture analogue to digital converter 922 converts the downstream radio frequency signal shown in FIG. 13 into the digital domain which is fed to a demodulator 919. The demodulator 919 includes a digital down conversion unit 924 and an OFDM demodulator 926 which operate to recover the payload data and the physical layer signalling data from the downstream signal in the digital domain as explained above with reference to the receiver shown in FIG. 7. Thus the digital down conversion unit 924 performs the function of down converting the parts of the downstream signal to recover the OFDM symbols which are carrying a data profile for which the receiver is recovering the payload data. The OFDM demodulator 926 then recovers the data from the down converted downstream signal and may include an FFT processor and an OFDM demodulator as explained with reference to FIG. 7.

As for the example illustrated in FIG. 7 a base band decoder 925 is provided which performs the same operation of recovering the payload data and the physical layer signalling data from the data which has been recovered by the demodulator 919.

A controller 954 of the receiver shown in FIG. 14 is arranged to receive data from the decoder 925 and to control the operation of the receiver in response to the physical layer signalling recovered. For example, the (L1) physical layer signalling includes an indication of the communications resources of the downstream signal which include a data profile for which the receiver is recovering the payload data. Accordingly the L1 physical layer data is used to adapt the receiver to recover the payload data from the time or frequency slice.

As explained above the physical layer signalling also includes a sleep indication signal. In the active mode of operation shown in FIG. 14 the controller 954 controls the sampling rate of the full band capture analogue to digital converter 922 to be substantially in accordance with a rate which is required to capture and to convert into the digital domain all of the downstream signal which for the present example may be approximately 3 Giga samples per second, in accordance with the 3 GHz clock. The 3 Giga samples per second of 12 bit samples captures the full bandwidth of the downstream signal, which has a maximum frequency of 1.2 GHz in accordance with Nyquist theory.

Also shown in FIG. 14, the RF switch 904 selects the output of the first receiving filter which has a bandwidth of 1.25 GHz which corresponds to the bandwidth of the downstream signal and therefore acts as an anti-aliasing filter.

Figure 15:
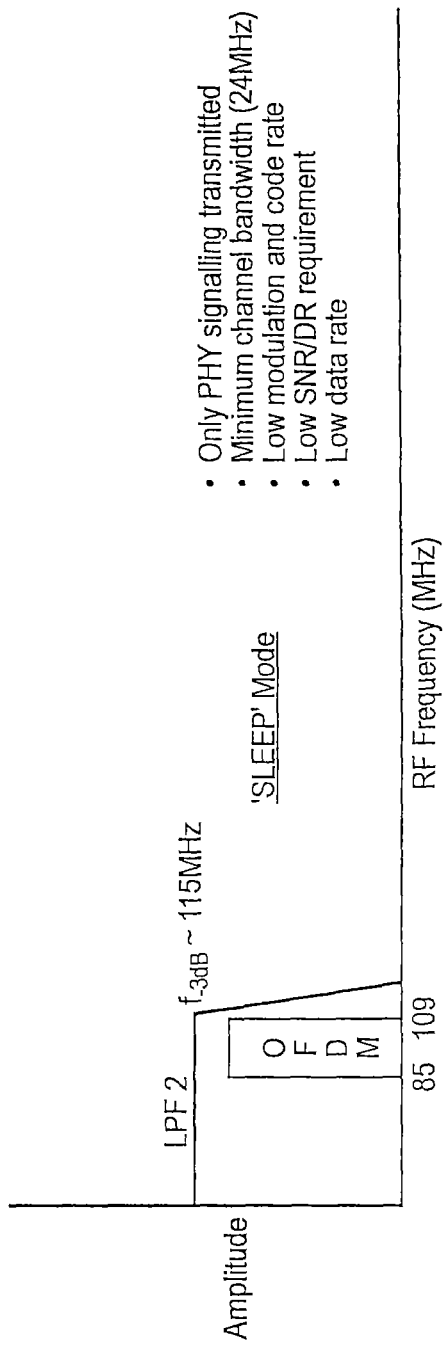
FIG. 15 is a graphical plot of amplitude with respect to frequency illustrating a pass band of a low pass filter forming a second analogue receiving filter, in which the pass bandwidth includes only a part of the downstream signal carrying physical layer signalling data providing a sleep mode or mode switch signal.

FIG. 15 shows a simplified representation of the sleep mode (mode switch) signal which is provided in the preamble of the downstream signal and more specifically in an OFDM symbol which occupies a low frequency component of the downstream signal. Thus the second analogue receiving filter 902 has a bandwidth of 115 MHz and therefore can capture the sleep mode signal which is transmitted in a frequency range of for example 85 MHz to 109 MHz. Moreover the second analogue receiving filter 902 forms an anti-aliasing filter when the sampling rate of the analogue to digital converter 922 is reduced to 250 Mega samples per second, with a clock speed of 250 MHz.

In one example the mode switch signal provides an indication to the receiver to enter a sleep mode. In another example the mode switch signal provides an indication that the receiver which is currently in a sleep mode should switch to the active mode. In one example the receiver automatically powers down if it has not received payload data from the cable network for a predetermined time. Accordingly, the mode switch indication may in fact be a wake up indication, as indicated for the example content of the preamble mentioned in FIG. 11. The mode switch signal can therefore inform the receiver that it should switch from the sleep mode to the active mode, and accordingly the term "mode switch" signal has been adopted to generically describe the sleep mode signal.

Figure 16:
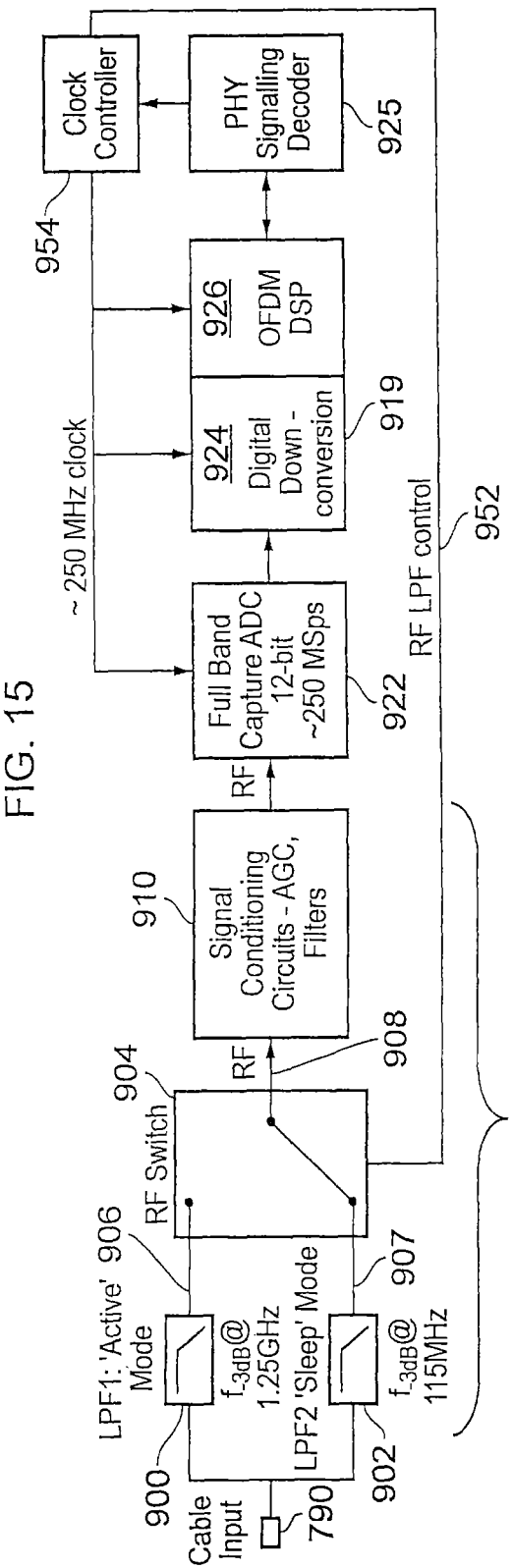
FIG. 16 is a schematic block diagram of the example receiver shown in FIG. 14 operating in a sleep mode.

As indicated from the text shown in FIG. 15, in one example the physical layer signalling transmitted within the preamble of the downstream signal is transmitted with a lower order modulation scheme then the modulation scheme which has been used to carry the payload data on the sub-carriers of the OFDM symbols which are allocated to data profiles. For example, whilst the payload data may be carried by 1028QAM or higher order modulation schemes for cable network systems, the physical layer signalling may be carried by 16QAM or 4QAM. As such, because the physical layer signalling is carried using a lower order modulation scheme then a lower signal to noise ratio is required to recover then physical layer signalling compared with the payload data. As such various digital and analogue components of the receiver can be arranged to operate in a reduced power mode, to reflect the reduction in the signal to noise ratio. For example, as explained, the analogue receiving filters can have a greater noise floor, and therefore have a lower power implementation, the operating rate of error correction decoders can be lower to reflect a higher rate code and the sampling rate of the sub-carriers and the demodulator can be arranged to operate at a lower rate thereby saving power. Whilst FIG. 14 provides an illustration of the receiver operating in the active mode, FIG. 16 provides the same diagram as shown in FIG. 14 but with the receiver operating in the sleep mode. In the sleep mode, as mentioned above, the controller 954 switches the sampling rate of the full band capture analogue to digital converter 922 from approximately 3 Giga samples per second to only 250 Mega samples per second with a 12 bit resolution. Furthermore, the controller 954 controls the RF switch 904 to switch the output from the second analogue receiving filter 902 to the input 908 of the signalling conditioning circuit 910. The bandwidth of the low pass filter forming the second analogue receiving filter 902 for the sleep mode is only 115 MHz. Accordingly, as will be appreciated when the receiver is operating in the sleep mode, the receiver only needs to receive the physical layer signalling transmitted in the lower bandwidth component of the preamble which includes the sleep indication signal. The sleep indication signal therefore represents an indication as to whether or not payload data is to be received by the receiver. If there is no payload data to be received then the receiver can power down in which case there is no need to perform full band capture of the received downstream signal. Thus by reducing the sampling rate of the full band capture analogue to digital converter 922 to approximately 250 Mega samples per second a power saving can be achieved. In correspondence with the reduction in the sampling rate to 250 Mega samples per second the receiver filter switches to the sleep mode in which the downstream signal is filtered by the second analogue receiving filter with a bandwidth which matches the sampling rate of the full band capture analogue to digital converter.

Accordingly, it will be appreciated that the controller can control the operation of the receiver to switch between an active mode in which the analogue to digital converter is operating at a first sampling rate and the analogue receiving filter has a first frequency band to perform anti-aliasing filtering with respect to the first sampling rate. In the sleep mode the controller 954 switches to a second lower sampling rate and in correspondence the analogue receiving filter switches to a second frequency band which performs anti-aliasing filtering with respect to the second sampling rate. As such a reduction in power consumption of the receiver is achieved because the receiver is operating at a lower sampling rate in which it is only recovering data within a low frequency component of the downstream signal in which the sleep indication/wake-up indication signal is transmitted.

Figure 17:
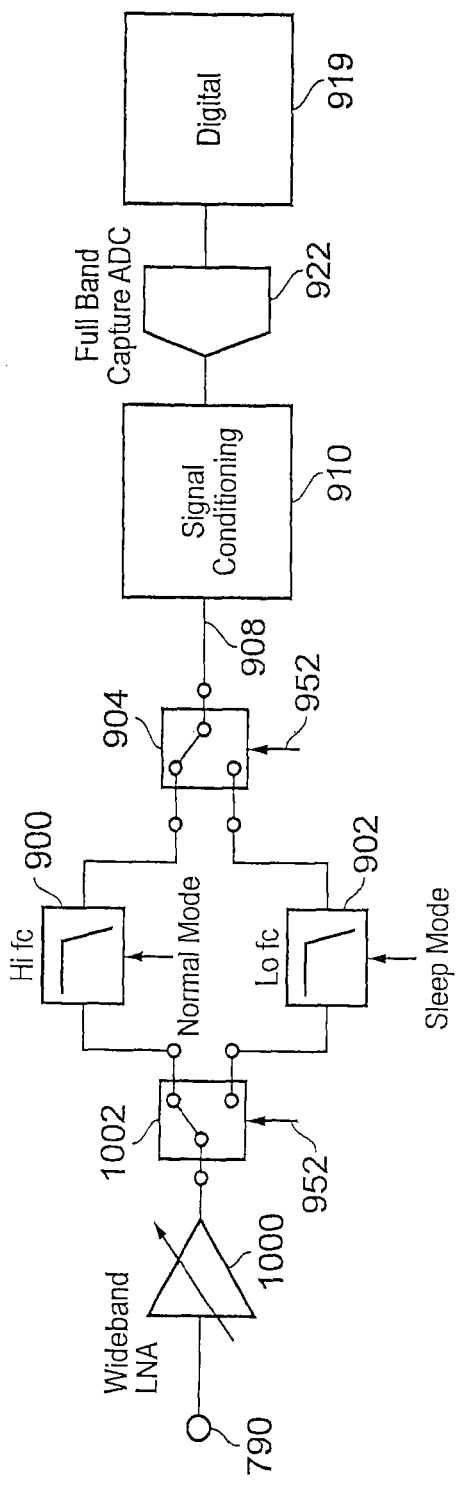
FIG. 17 is a schematic block diagram of another example of the receiver shown in FIGS. 14 and 16.
Figure 18:
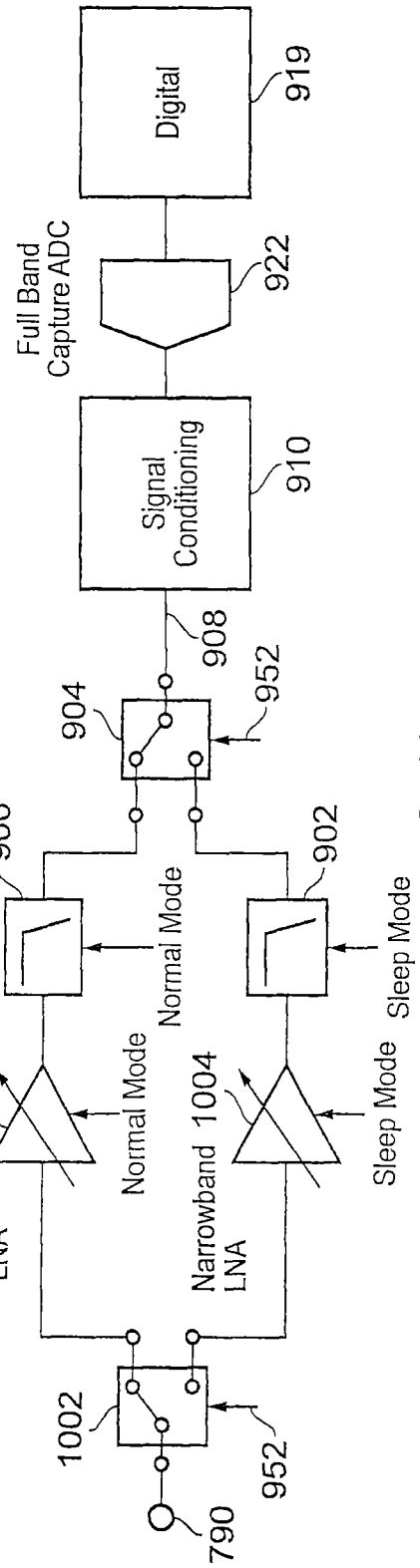
FIG. 18 is a schematic block diagram of another example of the receiver shown in FIGS. 14 and 16.

Two further example receiver architectures embodying the present technique are shown in FIGS. 17 and 18 which correspond substantially to the examples shown in FIGS. 14 and 16 and so use the same numerical references.

In the example shown in FIG. 17 a wideband low noise amplifier 1000 is provided before the analogue receiving filter 900, 902 which includes for example the first analogue receiving filter 900 for the active mode and the second analogue receiving filter 902 for the sleep mode as explained with reference to FIGS. 14 and 16. The wideband low noise amplifier 1000 receives the downstream signal and amplifies the downstream signal in the analogue domain across the entire bandwidth of the downstream signal. An output of the wideband low noise amplifier 1000 is fed to a switch 1002 which switches the output from the low noise amplifier 1000 to either the first analogue receiving filter 900 or the second analogue receiving filter 902 depending on whether the receiver is in the active mode or the sleep mode. Using a switch 1002 to switch the output of the wideband load noise amplifier 1000 to either the first or the second receiving filters reduces noise in the components of the receiver and can also save power.

An alternative architecture is shown in FIG. 18 which differs to that shown in FIG. 17 in that the radio frequency switch 1002 receives the downstream signal from the cable network connection 790 and feeds either the downstream signal to a first wideband low noise amplifier 1000 or a second narrowband low noise amplifier 1004, which amplify the downstream signal before the downstream signal is fed respectively to the first analogue receiving filter 900 or the second analogue receiving filter 902. According to this example embodiment the wideband low noise amplifier 1000 has a first pass band which corresponds to the full bandwidth of the downstream signal, whereas the second narrowband low noise amplifier has a bandwidth corresponding to the second frequency band in which only the sleep mode signal of the preamble is passed. Accordingly, by using the narrowband low noise amplifier 1004 in the sleep mode a saving in power is provided because the second narrowband low noise amplifier 1004 only needs to amplify a signal within a low frequency component of the downstream signal and at a dynamic range sufficient for the receiver to recover the signalling information transmitted using lower order QAM modulation than the transmitted data payload.

According to some embodiments other components of a receiver may be configured to respond to the sleep mode or mode switch signal to change from an active state to a passive state to save power. In one example the dynamic range of an analogue circuit is reduced by reducing biasing currents.

Various aspects and feature of the present disclosure are defined in the appended claims. Whilst embodiments of the disclosure have been described with reference to the orthogonal frequency division multiplexing and a DOCSIS cable modem system it will be appreciated that a receiver embodying the present technique as defined in the appended claims could be applied to other signals transmitted from any communications system which may in accordance with different cable, satellite or terrestrial modems or any other systems.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. It will be appreciated that the above description for clarity has described embodiments with reference to different functional units, circuitry and/or processors. However, it will be apparent that any suitable distribution of functionality between different functional units, circuitry and/or processors may be used without detracting from the embodiments.
Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.r to be described in connection with particular embodiments, one skilled in the art would recognize that various features of the described embodiments may be combined in any manner suitable to implement the technique.

The following numbered clauses provide further example aspects and features of the present disclosure:

1. A receiver for receiving payload data from a downstream signal, the receiver comprising an analogue receiving filter configured to receive the downstream signal representing the payload data, and including physical layer signalling data identifying downstream communications resources which represent the payload data, an analogue to digital converter configured to receive the downstream signal from the analogue receiving filter and to convert the downstream signal into a sampled digital form in accordance with a sampling rate which is matched to a bandwidth of the analogue receiving filter, a demodulator configured to demodulate the digital form of the downstream signal to recover the payload data and the physical layer signalling data, wherein the physical layer signalling data includes a mode switch signal to indicate whether the receiver should switch from one of an active mode or a sleep mode to the other of the active mode and the sleep mode, and a controller configured to detect the mode switch signal and in response to the mode switch signal to control the analogue to digital converter to switch from a first sampling rate to a second sampling rate, and to control the analogue receiving filter to switch from a first frequency band to a second frequency band, wherein the first frequency band serves to perform anti-alias filtering in respect of the first sampling rate, and the second frequency band serves to perform anti-alias filtering in respect of the second sampling rate.

2. A receiver according to clause 1, wherein the downstream signal provides the payload data transmitted within the first frequency band, and the physical layer signalling provides the mode switch signal is transmitted in the first and second frequency bands, the second frequency band being less than and within the first frequency band.

3. A receiver according to clause 1 or 2, comprising a low noise amplifier configured to receive the downstream signal and to amplify the downstream signal in the analogue domain and the analogue receiving filter is configured to receive the amplified downstream signal and to filter the amplified downstream signal before the digital to analogue converter converts the downstream signal to the digital domain, wherein the controller is configured in response to the mode switch signal to control the low noise amplifier to switch from amplifying the downstream signals within the first frequency band to amplifying the downstream signals within the second frequency band.

4. A receiver according to clause 3 or 4, wherein the low noise amplifier comprises a wideband low noise amplifier having a bandwidth corresponding to the first frequency band and a narrowband low noise amplifier having a bandwidth corresponding to the second frequency band and a first switch configured to switch the downstream signal to either the wideband low noise amplifier or the narrowband low noise amplifier in response to the controller.

5. A receiver according to any of clauses 1, 2 or 3, wherein the analogue receiving filter comprises a first analogue filter having a first pass band corresponding to the first frequency band and a second analogue filter having a second pass band corresponding to the second frequency band, and a second switch which configured to select an output from either the first analogue filter or the second analogue filter under the control of the controller.

6. A receiver according to any of clauses 1 to 5, wherein the downstream signal comprises one or more data profiles transmitted in scheduling intervals, each of the one or more data profiles providing the payload data according to a different receiver profile and being carried by different downstream communications resources within the scheduling intervals, and the physical layer signalling data includes data identifying the downstream communications resources of the data profiles in each of the scheduling intervals, wherein the physical layer signalling data is received as a preamble of one of the scheduling intervals.

7. A receiver according to clause 6, wherein the mode switch signal is provided within the preamble of the downstream signal within the second frequency band.

8. A receiver according to clause 6 or 7, wherein the payload data and the physical layer signalling are carried in the downstream signal by modulating one or more OFDM symbols, and the demodulator includes a fast Fourier transformer configured to convert the one or more OFDM symbols into the frequency domain and an OFDM demodulator to recover the payload data and the physical layer data from sub-carriers of the one or more OFDM symbols in the frequency domain.

9. A receiver according to any of clauses 1 to 8, wherein the physical layer signalling transmitted within the preamble of the downstream signal is transmitted with a lower order modulation scheme then the modulation scheme which has been used to modulate the sub-carriers of the OFDM symbols, and at least the second receiving filter is adapted to operate with a lower power in accordance with the lower order modulation scheme.

10. A method of receiving payload data from a downstream signal, the method comprising filtering the downstream signal with an analogue receiving filter, the downstream signal representing the payload data, and including physical layer signalling data identifying downstream communications resources which represent the payload data, analogue to digital converting the downstream signal received from the analogue receiving filter, to convert the downstream signal into a sampled digital form in accordance with a sampling rate which is matched to a bandwidth of the analogue receiving filter, demodulating the digital form of the downstream signal to recover the payload data and the physical layer signalling data, detecting a mode switch signal in the physical layer signalling data, the mode switch signal indicating whether the receiver should switch from one of an active mode or a sleep mode to the other of the active mode and the sleep mode, and in response to the mode switch signal controlling the analogue to digital converter to switch from a first sampling rate to a second sampling rate, and controlling the analogue receiving filter to switch from a first frequency band to a second frequency band, wherein the first frequency band serves to perform anti-alias filtering in respect of the first sampling rate, and the second frequency band serves to perform anti-alias filtering in respect of the second sampling rate.

11. A method according to clause 10, wherein the downstream signal provides the payload data transmitted within the first frequency band, and the physical layer signalling provides the mode switch signal in the first and second frequency bands, the second frequency band being less than and within the first frequency band.

12. A method according to clause 10 or 11, comprising amplifying the downstream signal with a low noise amplifier in the analogue domain, and the filtering the downstream signal with the analogue receiving filter includes receiving the amplified downstream signal, and filtering the amplified downstream signal before the digital to analogue converting the downstream signal to the digital domain, and controlling the low noise amplifier, in response to the mode switch signal, to switch from amplifying the downstream signals within the first frequency band to amplifying the downstream signals within the second frequency band.

13. A method according to clause 11 or 12, wherein the controlling the low noise amplifier in response to the mode switch signal includes switching the downstream signal to either a wideband low noise amplifier having a bandwidth corresponding to the first frequency band or a narrowband low noise amplifier having a bandwidth corresponding to the second frequency band.

14. A method as claimed in any of clauses 10, 11, 12 or 13, wherein the analogue receiving filter comprises a first analogue filter having a first pass band corresponding to the first frequency band and a second analogue filter having a second pass band corresponding to the second frequency band, and the controlling the analogue receiving filter to switch from a first frequency band to a second frequency band includes selecting an output from either the first analogue filter or the second analogue filter.

15. A method as claimed in any of clauses 10 to 14, wherein the downstream signal comprises one or more data profiles transmitted in scheduling intervals, each of the one or more data profiles providing the payload data according to a different receiver profile and being carried by different downstream communications resources within the scheduling intervals, and the physical layer signalling data includes data identifying the downstream communications resources of the data profiles in each of the scheduling intervals, and the method comprises receiving the physical layer signalling data as a preamble of one of the scheduling intervals.

16. A method according to clause 15, wherein the mode switch signal is provided within the preamble of the downstream signal within the second frequency band.

17. A method as claimed in any of clauses 10 to 16, wherein the physical layer signalling transmitted within the preamble of the downstream signal is transmitted with a lower order modulation scheme then the modulation scheme which has been used to modulate the sub-carriers of the OFDM symbols, and the method comprises adapting at least the second receiving filter to operate with a lower power in accordance with the lower order modulation scheme of the physical layer signalling.

The invention claimed is:

1. A receiver for receiving payload data from a downstream signal, the receiver comprising:
   an analogue receiving filter configured to receive the downstream signal representing the payload data, the downstream signal including physical layer signaling data identifying downstream communications resources which represent the payload data;
   an analogue to digital converter configured to receive the downstream signal from the analogue receiving filter and to convert the downstream signal into a sampled digital form in accordance with a sampling rate which is matched to a bandwidth of the analogue receiving filter;
   a demodulator configured to demodulate the digital form of the downstream signal to recover the payload data and the physical layer signaling data, the physical layer signaling data including a mode switch signal to indicate whether the receiver should switch from one of an active mode or a sleep mode to the other of the active mode and the sleep mode; and
   a controller configured to detect the mode switch signal and in response to the mode switch signal to control the analogue to digital converter to switch from a first sampling rate to a second sampling rate, and to control the analogue receiving filter to switch from a first frequency band to a second frequency band, wherein the first frequency band serves to perform anti-alias filtering in respect of the first sampling rate, and the second frequency band serves to perform anti-alias filtering in respect of the second sampling rate, only the physical layer signaling data being encompassed in the second frequency band.

2. The receiver as claimed in claim 1, wherein the downstream signal provides the payload data transmitted within the first frequency band, and the physical layer signaling provides the mode switch signal is transmitted in the first and second frequency bands, the second frequency band being less than and within the first frequency band.

3. The receiver as claimed in claim 1, comprising a low noise amplifier configured to receive the downstream signal and to amplify the downstream signal in the analogue domain and the analogue receiving filter is configured to receive the amplified downstream signal and to filter the amplified downstream signal before the digital to analogue converter converts the downstream signal to the digital domain, wherein the controller is configured in response to the mode switch signal to control the low noise amplifier to switch from amplifying the downstream signals within the first frequency band to amplifying the downstream signals within the second frequency band.

4. The receiver as claimed in claim 3, wherein the low noise amplifier comprises a wideband low noise amplifier having a bandwidth corresponding to the first frequency band and a narrowband low noise amplifier having a bandwidth corresponding to the second frequency band and a first switch configured to switch the downstream signal to either the wideband low noise amplifier or the narrowband low noise amplifier in response to the controller.

5. The receiver as claimed in claim 1, wherein the analogue receiving filter comprises a first analogue filter having a first pass band corresponding to the first frequency band and a second analogue filter having a second pass band corresponding to the second frequency band, and a second switch which configured to select an output from either the first analogue filter or the second analogue filter under the control of the controller.

6. The receiver as claimed in claim 1, wherein the downstream signal comprises one or more data profiles transmitted in scheduling intervals, each of the one or more data profiles providing the payload data according to a different receiver profile and being carried by different downstream communications resources within the scheduling intervals, and the physical layer signaling data includes data identifying the downstream communications resources of the data profiles in each of the scheduling intervals, wherein the physical layer signaling data is received as a preamble of one of the scheduling intervals.

7. The receiver as claimed in claim 6, wherein the mode switch signal is provided within the preamble of the downstream signal within the second frequency band.

8. The receiver as claimed in claim 6, wherein the payload data and the physical layer signaling are carried in the downstream signal by modulating one or more OFDM symbols, and the demodulator includes a fast Fourier transformer configured to convert the one or more OFDM symbols into the frequency domain and an OFDM demodulator to recover the payload data and the physical layer data from sub-carriers of the one or more OFDM symbols in the frequency domain.

9. The receiver as claimed in claim 1, wherein the physical layer signaling transmitted within the preamble of the downstream signal is transmitted with a lower order modulation scheme then the modulation scheme which has been used to modulate the sub-carriers of the OFDM symbols, and at least the second receiving filter is adapted to operate with a lower power in accordance with the lower order modulation scheme.

10. A method of receiving payload data from a downstream signal, the method comprising
filtering the downstream signal with an analogue receiving filter, the downstream signal representing the payload data, the downstream signal including physical layer signaling data identifying downstream communications resources which represent the payload data;
analogue to digital converting the downstream signal received from the analogue receiving filter, to convert the downstream signal into a sampled digital form in accordance with a sampling rate which is matched to a bandwidth of the analogue receiving filter;
demodulating the digital form of the downstream signal to recover the payload data and the physical layer signaling data;
detecting a mode switch signal in the physical layer signaling data, the mode switch signal indicating whether the receiver should switch from one of an active mode or a sleep mode to the other of the active mode and the sleep mode;
in response to the mode switch signal controlling the analogue to digital converter to switch from a first sampling rate to a second sampling rate; and
controlling the analogue receiving filter to switch from a first frequency band to a second frequency band, wherein the first frequency band serves to perform anti-alias filtering in respect of the first sampling rate, and the second frequency band serves to perform anti-alias filtering in respect of the second sampling rate, only the physical layer signaling data being encompassed in the second frequency band.

11. The method as claimed in claim 10, wherein the downstream signal provides the payload data transmitted within the first frequency band, and the physical layer signaling provides the mode switch signal in the first and second frequency bands, the second frequency band being less than and within the first frequency band.

12. The method as claimed in claim 10, comprising
amplifying the downstream signal with a low noise amplifier in the analogue domain, and the filtering the downstream signal with the analogue receiving filter includes
receiving the amplified downstream signal, and
filtering the amplified downstream signal before the digital to analogue converting the downstream signal to the digital domain, and
controlling the low noise amplifier, in response to the mode switch signal, to switch from amplifying the downstream signals within the first frequency band to amplifying the downstream signals within the second frequency band.

13. The method as claimed in claim 12, wherein the controlling the low noise amplifier in response to the mode switch signal includes
switching the downstream signal to either a wideband low noise amplifier having a bandwidth corresponding to the first frequency band or a narrowband low noise amplifier having a bandwidth corresponding to the second frequency band.

14. The method as claimed in claim 10, wherein the analogue receiving filter comprises a first analogue filter having a first pass band corresponding to the first frequency band and a second analogue filter having a second pass band corresponding to the second frequency band, and the controlling the analogue receiving filter to switch from a first frequency band to a second frequency band includes selecting an output from either the first analogue filter or the second analogue filter.

15. The method as claimed in claim 10, wherein the downstream signal comprises one or more data profiles transmitted in scheduling intervals, each of the one or more data profiles providing the payload data according to a different receiver profile and being carried by different downstream communications resources within the scheduling intervals, and the physical layer signaling data includes data identifying the downstream communications resources of the data profiles in each of the scheduling intervals, and the method comprises receiving the physical layer signaling data as a preamble of one of the scheduling intervals.

16. The method as claimed in claim 15, wherein the mode switch signal is provided within the preamble of the downstream signal within the second frequency band.

17. The method as claimed in claim 15, wherein the payload data and the physical layer signaling are carried in the downstream signal by modulating one or more OFDM symbols, and the demodulating includes fast Fourier transforming the downstream signal to convert the one or more OFDM symbols into the frequency domain and OFDM demodulating the one or more OFDM symbols to recover the payload data and the physical layer data from sub-carriers of the one or more OFDM symbols in the frequency domain.

18. The method as claimed in claim 10, wherein the physical layer signaling transmitted within the preamble of the downstream signal is transmitted with a lower order modulation scheme then the modulation scheme which has been used to modulate the sub-carriers of the OFDM symbols, and the method comprises adapting at least the second receiving filter to operate with a lower power in accordance with the lower order modulation scheme of the physical layer signaling.

19. A cable modem for receiving payload data from a downstream signal from a cable modem termination system, the receiver comprising an analogue receiving filter configured to receive the downstream signal representing the payload data, and including physical layer signaling identifying downstream communications resources which represent the payload data in the downstream signal;

an analogue to digital converter configured to receive the downstream signal from the analogue receiving filter and to convert the downstream signal into a sampled digital form in accordance with a sampling rate determined by a receiver clock;

an demodulator configured to demodulate the digital form of the downstream signal to recover the payload data and the physical layer signaling data, wherein the physical layer signaling includes a mode switch signal to indicate whether the receiver should switch from one of an active mode or a sleep mode to the other of the active mode and the sleep mode, and a controller configured to detect the mode switch signal and in response to the mode switch signal to control the analogue to digital converter to switch from a first clock frequency to a second clock frequency, and to control the analogue receiving filter to switch from a first frequency band to a second frequency band, only the physical layer signaling data.

* * * * *